United States Patent
Ye et al.

(10) Patent No.: US 11,320,025 B2
(45) Date of Patent: May 3, 2022

(54) PLANETARY GEAR MODULE FOR SWING DRIVE

(71) Applicant: Guangxi LiuGong Machinery Co., Ltd., Liuzhou Guangxi (CN)

(72) Inventors: Qin Ye, Guangxi (CN); Qilin Niu, Guangxi (CN); Zaiyi Lu, Guangxi (CN); Wanbin Yan, Guangxi (CN); Renke Jiang, Guangxi (CN); Tianming Shao, Guangxi (CN); Edward Wagner, Guangxi (CN)

(73) Assignee: Guangxi LiuGong Machinery Co., Ltd., Guangxi (CN)

( * ) Notice: Subject to any disclaimer, the term of this patent is extended or adjusted under 35 U.S.C. 154(b) by 21 days.

(21) Appl. No.: 16/585,886

(22) Filed: Sep. 27, 2019

(65) Prior Publication Data

US 2020/0166101 A1 May 28, 2020

(30) Foreign Application Priority Data

Nov. 23, 2018 (WO) ................ PCT/CN2018/117230

(51) Int. Cl.
*F16H 1/46* (2006.01)
*E02F 9/12* (2006.01)
(Continued)

(52) U.S. Cl.
CPC ............... *F16H 1/46* (2013.01); *E02F 9/123* (2013.01); *F16H 1/32* (2013.01); *F16H 57/082* (2013.01)

(58) Field of Classification Search
CPC . F16H 1/46; F16H 1/32; F16H 57/082; F16H 57/08; F16H 1/28; F16H 3/62;
(Continued)

(56) References Cited

U.S. PATENT DOCUMENTS 8,133,143 B2 * 3/2012 Schoon ................ B60K 7/0007
475/156
2012/0309577 A1 * 12/2012 Komaru .................. F16D 55/36
475/149

(Continued)

FOREIGN PATENT DOCUMENTS

DE 19512976 A1 10/1996
EP 2570700 A1 3/2013
KR 20110116572 A 10/2011

*Primary Examiner* — David J Hlavka
(74) *Attorney, Agent, or Firm* — Young Basile Hanlon & MacFarlane, P.C.

(57) ABSTRACT

A planetary gear module for a swing reducer of a construction machine is provided. The planetary gear module can fit between first and second adjacent planetary gear modules. The planetary gear module comprises a planetary gear stage and a stage support for supporting the planetary gear stage, the stage support comprises an input support interface for stacking the first adjacent planetary gear module onto the planetary gear module and an output support interface for stacking the planetary gear module onto the second adjacent planetary gear module, the planetary gear stage comprises an input gear interface for operatively connecting the planetary gear module to the first adjacent planetary gear module and an output gear interface for operatively connecting the planetary gear module to the second adjacent planetary gear module. The input and output support interfaces as well as the input and output gear interfaces are configured to match to each other.

18 Claims, 3 Drawing Sheets

(51) Int. Cl.
*F16H 1/32* (2006.01)
*F16H 57/08* (2006.01)

(58) Field of Classification Search
CPC ........ F16H 57/023; E02F 9/123; E02F 9/128;
E02F 9/202
See application file for complete search history.

(56) References Cited

U.S. PATENT DOCUMENTS

| | | | | |
|---|---|---|---|---|
| 2013/0180809 | A1* | 7/2013 | Yabuuchi | B66C 23/84 |
| | | | | 188/71.5 |
| 2013/0248303 | A1* | 9/2013 | Okuno | E02F 9/128 |
| | | | | 188/67 |
| 2014/0296017 | A1* | 10/2014 | Okada | E02F 9/123 |
| | | | | 475/159 |
| 2015/0126319 | A1* | 5/2015 | Hamasaki | E02F 9/128 |
| | | | | 475/159 |
| 2015/0276044 | A1 | 10/2015 | Furusho et al. | |
| 2017/0024489 | A1* | 1/2017 | Bandholz | G06F 16/90344 |

* cited by examiner

PLANETARY GEAR MODULE FOR SWING DRIVE

CROSS-REFERENCE TO RELATED APPLICATION(S)

This application claims priority to and the benefit of International Patent Application Serial No. PCT/CN2018/117230, filed on Nov. 23, 2018, the entire disclosure of which is hereby incorporated by reference.

TECHNICAL FIELD

This disclosure relates to a planetary gear module for a swing drive, such as a swing reducer, of a construction machine. The construction machine may be an excavator or a crane. The disclosure further relates to a swing reducer comprising such a planetary gear module, and to a construction machine comprising such a swing reducer.

BACKGROUND

Construction machines, such as excavators, cranes and other construction machines with a swing function, may comprise a swing reducer. The swing reducer may be provided in the drive chain between a motor and a driven element for suitably transmitting the motor's output torque and angular velocity, respectively. Today's swing reducers are designed for a specific machine and exhibit a fixed gear ratio. Specifically, the gear ratio of existing swing reducers for construction machines may not be easily adapted. In contrast, for adapting the swing reducer's gear ratio, a basically entirely new swing reducer must be designed. Such swing reducers are known from US 2015 276 044 A1 and DE 195 129 76 A1, for example.

SUMMARY

One aspect of the disclosure relates to a planetary gear module for a swing drive of a construction machine. A swing drive may drive a swing movement of a component, which may be a positioning movement of said component in space. The swing drive may drive a swing movement about a swing axis. The swing axis may be a vertical axis of the construction machine, said vertical axis extending normal to a ground engaging plane of said construction machine. The construction machine may be an excavator, a crane or any other type of construction machine comprising a swing function. The planetary gear module may provide a transmission ratio/gear ratio between an input and an output, which may be different from |1|. For example, the transmission ratio can be larger than |1|, implying that the angular velocity at the output is decreased and that the torque at the output is increased compared to the magnitudes of the respective quantities at the input of the planetary gear module. However, it is also possible that the transmission ratio is smaller than |1|.

The planetary gear module is configured to be integrated in-between first and second adjacent planetary gear modules. In other words, the planetary gear module is configured in a modular fashion to be combined with further planetary gear modules. The further planetary gear modules may have interface configurations, which are designed identically to the interface configurations of the present planetary gear module so as to allow for a modular combination/coupling of the plurality of modules.

The planetary gear module comprises a planetary gear stage and a stage support for supporting the planetary gear stage. The stage support may be at least partially formed by the planetary gear stage. Alternatively or additionally, the stage support may be formed by a component or a component assembly separate from the planetary gear stage. The stage support is configured to support and carry the planetary gear stage, respectively. The stage support comprises an input support interface for stacking the first adjacent planetary gear module onto the planetary gear module. Likewise, the stage support comprises an output support interface for stacking the planetary gear module onto the second adjacent planetary gear module. In other words, the element carrying the planetary gear stage, i.e. the stage support, is configured to mount the present module onto an adjacent module and to mount an adjacent module onto the present module. The input support interface and the output support interface may be situated at opposite sides of the planetary gear module. The stage support may be formed as a tower segment, the tower segment exhibiting a cylindrical shape, with the input and output support interfaces being provided at the top and bottom of the tower segment, respectively.

In addition, the planetary gear stage comprises an input gear interface for operatively connecting the planetary gear module to a gear of the first adjacent module. In other words, the input gear interface is configured such that a power, e.g. a mechanical power, may be inputted into the planetary gear module via the input gear interface. The input gear interface may be configured such that a shaft may be connected thereto so as to input the above-noted mechanical power into the planetary gear module. Furthermore, the planetary gear module comprises an output gear interface for operatively connecting the planetary gear module to a gear of the second adjacent module. The output gear interface is configured to output a mechanical power, which was inputted via the input gear interface, from the planetary gear module according to the present disclosure to introduce said power into an adjacent planetary gear module. In other words, via the input gear interface, a power that is to be transmitted with the planetary gear module is inputted, while the transmitted power is outputted via the output gear interface.

The output support interface and the input support interface as well as the output gear interface and the input gear interface of the planetary gear module according to the present disclosure are configured to match to each other. The output support interface may be formed complementary to the input support interface. Likewise, the output gear interface may be formed complementary to the input gear interface. The matching of two interfaces to each other may imply that said interfaces may be directly coupled to each other without any additional components to fulfill their desired functionality. Alternatively, the matching of two interfaces to each other may imply that said interfaces may be indirectly coupled to each other with additional components therebetween, e.g. a transition sleeve, to fulfill their desired functionality. In any case, two interfaces, which are matched to each other, each exhibit a specific design to adapt the interface to the other interface of the two matched interfaces.

The planetary gear module allows for a modular design (i.e. modular structure or modular construction) of a swing reducer. More specifically, the planetary gear module comprises input and output interfaces, which are configured to match each other. Therefore, for realizing swing reducers with different gear ratios for different construction machines and/or for adapting the gear ratio of an existing swing reducer, multiple planetary gear modules according to the present disclosure can be suitably combined for realizing the required specifications. In other words, multiple planetary gear modules according to the present disclosure may be stacked on and operatively connected with each other. Thus, with the planetary gear module according to the present disclosure, a high universality of parts, different gear ratios, low development cost, short development cycles, and a wide application range can be achieved. Furthermore, a simple and reliable manufacturing method of a swing reducer can be provided. Specifically, when a respective interface of a module does not match an interface of the to-be-connected adjacent module, connection between the planetary gear modules may become impossible. Thus, a failure due to incorrect assembly can be reliably prevented during manufacturing.

In an embodiment, the planetary gear stage of the planetary gear module comprises a sun gear, a planetary carrier, and a ring gear. The planetary carrier can be an assembly with at least one planet gear and a corresponding planet axle (shaft). The planetary carrier may comprise four planet gears. The planet gears may mesh with the sun gear and the ring gear, wherein the sun gear and the ring gear may not mesh with each other. Each of the elements of the planetary gear stage may form the input gear interface or the output gear interface, as derivable from the below table, in which S=number of teeth of sun gear and R=number of teeth of ring gear.

| torque input via | torque output | stationary/fixed | resulting gear ratio |
| --- | --- | --- | --- |
| sun gear (S) | planetary carrier (C) | ring gear (R) | 1 + R/S |
| planetary carrier (C) | ring gear (R) | sun gear (S) | 1/(1 + S/R) |
| sun gear (S) | ring gear (R) | planetary carrier (C) | −R/S |

The ring gear may completely house the sun gear. Here, "completely housing" may mean to entirely accommodate the sun gear inside the ring gear, e.g. in a longitudinal direction extending from the input support interface to the output support interface, for example. When the ring gear completely houses the sun gear, it is possible to easily stack respective planetary gear modules onto each other. Furthermore, the ring gear(s) may form a housing of the planetary gear module, e.g. by combining the function of the housing with the function of the ring gear in one constructional component. This results in a reduced number of components, thereby decreasing manufacturing costs and weight. This advantage is additionally enhanced if the ring gear forms the stage support. The ring gear may be formed as a hollow cylinder with toothing on the inside, for example.

According to an embodiment, the ring gear comprises an opening, such as a through hole, for insertion of a bolt to fix the planetary gear module to the first and second adjacent planetary gear modules. By fixing the planetary gear modules together via a bolt, which may be inserted into the through hole, the different planetary gear modules may be easily anchored with each other. The bolt on the one hand may restrict relative rotational movement of adjacent planetary gear modules and on the other hand fix adjacent planetary gear modules together in longitudinal direction. Complex and cost intensive connection methods can thus be avoided. The bolt may be a screw or any other type of bolt. The bolt may be configured to attach the planetary gear module to the housing of a swing reducer and/or connect multiple planetary gear modules according to the present disclosure with each other.

The input gear interface may comprise a spline. The spline may comprise ridges and/or teeth for meshing with mating depressions, e.g. grooves, in a corresponding element for transferring torque. The spline may comprise a parallel key spline, an involute spline, a crowned spline, a serration and/or a ball spline. In one embodiment, the input gear interface is formed by the sun gear of the planetary gear stage. In this embodiment, the sun gear comprises the spline. This provides the advantage that a reliable torque transmission from the planetary gear module to an adjacent module is possible with low complexity. Furthermore, it allows for an easy connection of adjacent planetary gear modules without any additional tools. The sun gear may comprise a groove for accommodating a snap ring, with which a transition sleeve for connecting the input gear interface to the gear of the first adjacent module may be positioned. The snap ring, which may be provided in the groove, may form a limit stop for the transition sleeve so as to position the latter in space. The groove may therefore allow for a simple and reliable connection of two planetary gear modules according to the present disclosure with each other.

According to an embodiment, the output gear interface is formed by the planetary carrier. In this embodiment, the ring gear may be fixed and/or the sun gear may form the input gear interface. In one example, the planetary carrier comprises a bushing. The bushing may comprise a proximal end and a distal end, wherein the distal end may be facing away from the input gear interface. The bushing may be formed as a hollow cylinder. In one example, the bushing comprises an inner spline, which is formed on the inside of the bushing. The spline may be formed as the above-described spline of the input gear interface. According to an embodiment, the bushing extends beyond the ring gear. This allows for an overlapping of the output gear interface of the present module with the input gear interface of an adjacent module to provide a simple connection therebetween.

According to an embodiment, the input support interface and the output support interface are formed by complementary portions so as to allow for a form fit between said two parts. The input support interface may comprise a recess and the output support interface may comprise a complementary protruding portion, which may be inserted into the recess, or vice versa. This allows for a simply centering and structural coupling of adjacent planetary gear modules, which are formed according to the present disclosure.

Furthermore, the disclosure is related to a kit of parts comprising at least two planetary gear modules according to one of the above-described embodiments. In one example, the kit of parts comprises three sets each of which comprising three planetary gear modules. Each set may comprise planetary gear modules of the same gear ratio. However, the different sets may provide different gear ratios. As described above, by arbitrarily combining and connecting the different planetary gear modules of the kit of parts in series, a swing reducer with different gear ratios can be realized without any constructional changes of any of the planetary gear modules. For example, the number of teeth of any gear of the planetary gear module does not have to be changed for providing different gear ratios.

In addition, the disclosure relates to a system comprising a first and a second planetary gear module according to one of the above described embodiments. The output support interface of the first module is engaged with the input support interface of the second module; and the output gear interface of the first module is operatively connected to the input gear interface of the second module. The system may further comprise a transition sleeve, wherein the transition sleeve is arranged to operatively connect the output gear interface of the first module to the input gear interface of the second module. The transition sleeve may be formed as a hollow ring, which may comprise an inner spline to engage with the input gear interface of the second module and an outer spline to engage with the output gear of the first module. Concerning the understanding and advantages of the individual features, it is referred to the above.

The disclosure is further directed to a swing reducer comprising a planetary gear module according to one of the above described embodiments and a housing. One of the planetary gear modules is attached to the housing, such as via a bolt. The bolt extends through a through hole formed in a ring gear of the planetary gear module. Furthermore, the disclosure is directed to a construction machine comprising an undercarriage, a superstructure, and a drive mechanism for rotating the undercarriage relatively to the superstructure. The drive mechanism comprises the above described swing reducer. Concerning the understanding and advantages of the individual features, it is referred to the above.

Furthermore, the disclosure is directed to a method of retrofitting a swing reducer of a construction machine. The method comprises a step of providing a swing reducer according to the above described embodiment, and a step of adding, removing or replacing a planetary gear module according to any of the above described embodiments to/from the swing reducer.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
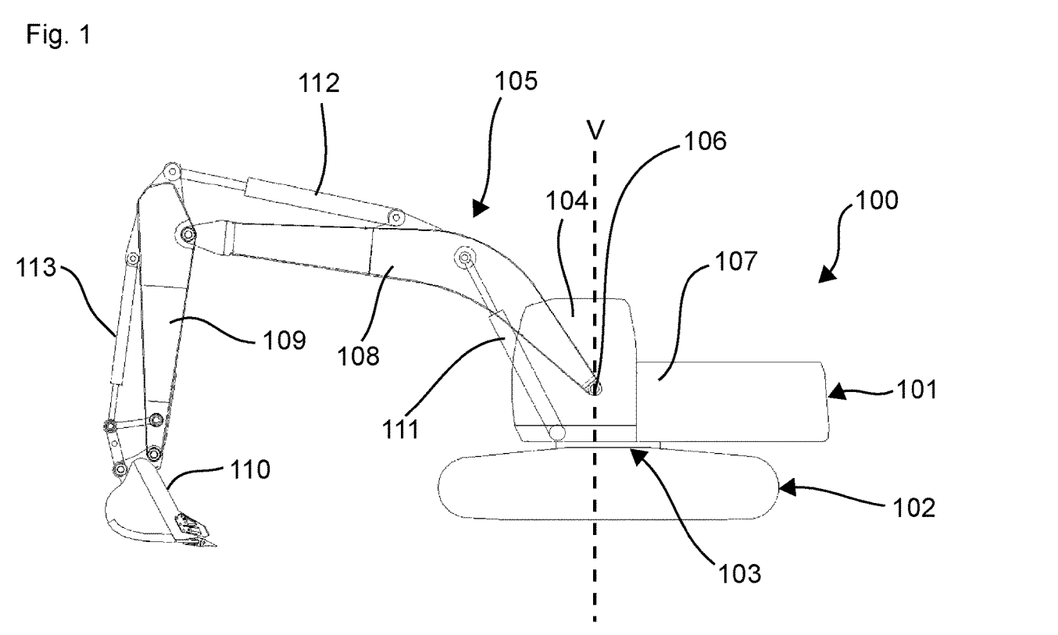
FIG. 1 schematically shows an excavator comprising a swing reducer assembly in a side view according to an embodiment of the present disclosure.

FIG. 1 shows a schematic side view of an excavator 100 according to an embodiment of the present disclosure. The excavator 100 comprises a superstructure 101, also called top frame, platform or upper carriage, which is rotatably coupled to an undercarriage 102 via a swing reducer assembly 103. Tracks are mounted to the undercarriage 102 for moving the excavator 100. Instead of the tracks, the excavator may comprise wheels. The superstructure 101 comprises an operator's cab 104 and a boom assembly 105, which is pivotably mounted to the superstructure 101 at a hinge portion 106, the hinge portion 106 being provided next to the operator's cab 104 in width direction of the superstructure 101. In addition, the superstructure 101 comprises an engine compartment 107, which is situated behind the operator's cab 104 at a rear portion of the superstructure 101. The engine compartment 107 houses one or multiple power sources for providing power required to operate the excavator 100. The power sources can include but are not limited to an internal combustion engine, such as a Diesel engine, which can be coupled to further equipment such as hydraulic pumps, generators and the like. Alternatively or additionally, the power sources can include a battery and an electric engine. The power source is used to provide power for driving the tracks or wheels and/or for providing power for actuators of the excavator 100.

In the present embodiment, the boom assembly 105 comprises a boom arm 108 with a proximal end and a distal end, the proximal end being connected to the hinge portion 106 of the superstructure 101. The distal end of the boom arm 108 is pivotably connected to a proximal end of a dipper arm 109, also called stick or bucket arm. To the distal end of the dipper arm 109, an equipment, e.g. a bucket 110, is pivotably coupled. The boom arm 108 is movable by means of a first hydraulic cylinder 111 supported on the superstructure 101 and coupled to the boom arm 108, the dipper arm 109 is movable by means of a second hydraulic cylinder 112 supported by the boom arm 108 and connected to the proximal end of the dipper arm 109, and the bucket 110 is movable by means of a third hydraulic cylinder 113 supported by the dipper arm 109 and coupled to the bucket 110. It is to be noted, that although only one first hydraulic cylinder 111 is shown in FIG. 1, it is possible to use two hydraulic cylinders 111, one on each side of the boom arm 108. The hydraulic cylinders 111, 112 and 113 are powered by a power source housed in the engine compartment 107.

As described above, a swing reducer assembly 103 is provided between the undercarriage 102 and the superstructure 101. The swing reducer assembly 103 can be driven by a motor provided in the engine compartment 107 and/or by a separate motor (engine). The motor for driving the swing reducer assembly 103 may be a hydraulic and/or an electric motor. By driving the swing reducer assembly 103, it is possible to rotate the superstructure 101 comprising the boom assembly 105 about a vertical axis V of the excavator 100 relative to the undercarriage 102. More specifically, with the swing reducer assembly 103, a controlled rotational movement between the superstructure 101 and the undercarriage 102 can be realized.

Figure 2:
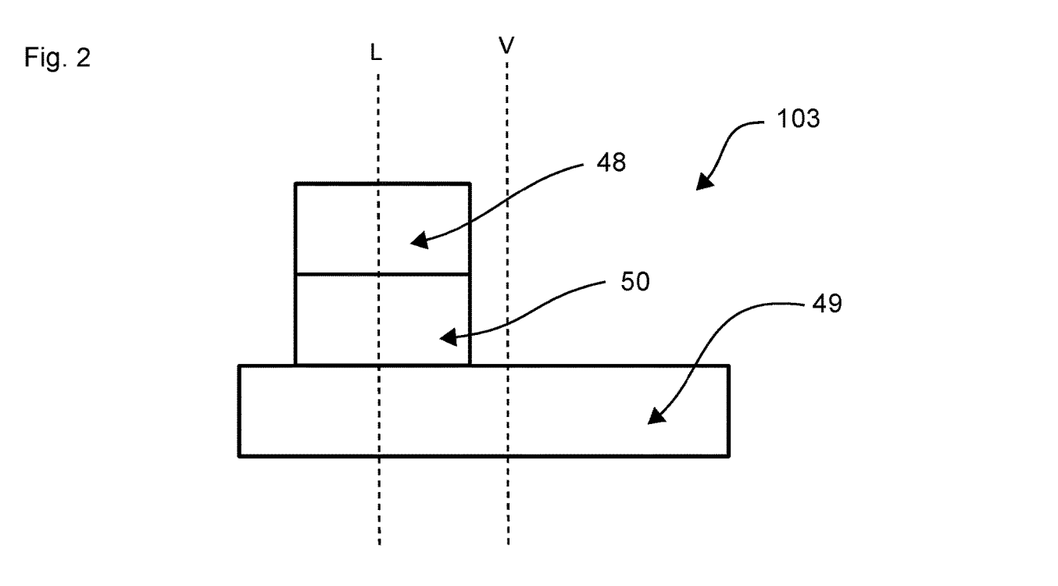
FIG. 2 schematically shows individual components of the swing reducer assembly of FIG. 1.

FIG. 2 schematically shows the configuration of the swing reducer assembly 103 of FIG. 1. The swing reducer assembly 103 comprises a motor 48, a swing reducer 50 and a slewing ring 49. The motor 48 is coupled to an input (shaft) of the swing reducer 50 to drive the swing reducer assembly 103. The swing reducer 50 provides a transmission ratio for converting an input torque, which is provided by the motor 48, into an output torque, which is supplied to the slewing ring 49. In the present embodiment, the swing reducer 50 is configured as a reduction gear, therefore exhibiting a transmission ratio, which is larger than 1. Accordingly, the angular velocity at the output of the swing reducer 50 is smaller than the angular velocity at the input thereof.

Accordingly, the torque at the output is larger than the torque at the input. The slewing ring 49 is rotationally fixed to the superstructure 101 on one side and to the undercarriage 102 at an opposite side thereof so as to allow for relative movement between the superstructure 101 and the undercarriage 102. Such a relative rotational motion between the undercarriage 102 and the superstructure 101 is driven by the motor 48 via the swing reducer 50.

Figure 3:
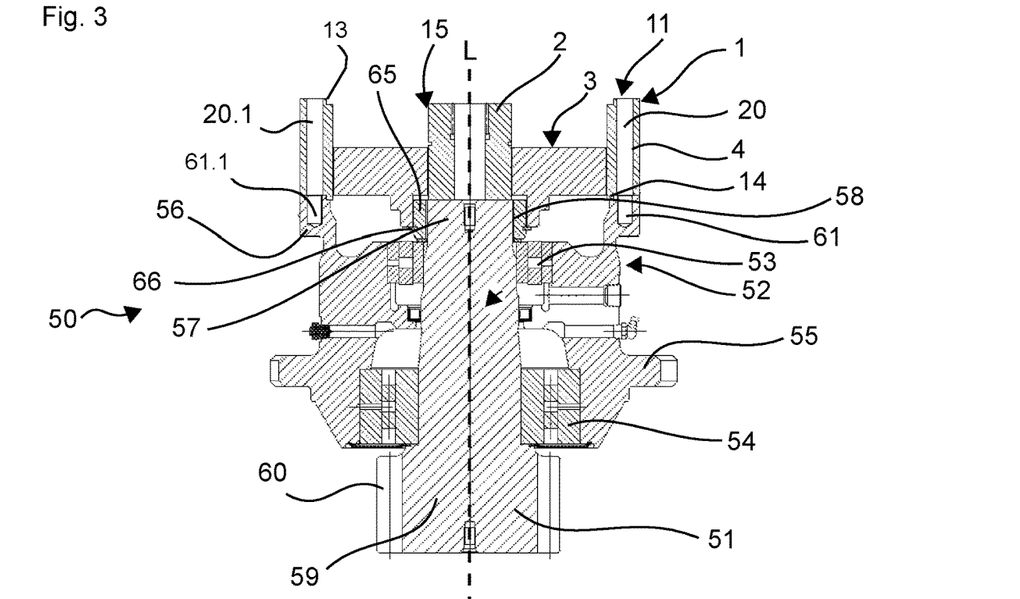
FIG. 3 schematically shows a cross-sectional view of a swing reducer according to a first embodiment of the present disclosure, the swing reducer comprising one planetary gear module.

In the following, the swing reducer 50 according to a first embodiment will be explained in further detail with reference to FIGS. 3 to 5. In FIG. 3, the swing reducer 50 with one planetary gear module 1 is shown. Besides the planetary gear module 1, the swing reducer 50 of the present embodiment comprises an output shaft 51 and a housing 52. The housing 52 is a casting accommodating the output shaft 51, which is rotatably supported in the housing 52 by a pair of bearings 53, 54. The bearings 53 and 54 may be formed as roller bearings, such as tapered roller bearings. However, also different types of bearings are possible in this regard. In the present embodiment, the output shaft 51 and the housing 52 are arranged coaxially with respect to each other, and coaxially with respect to the longitudinal axis L of the swing reducer 50. The longitudinal axis L of the swing reducer 50 may be oriented parallel to the vertical direction V of the excavator 100. The housing 52 comprises a flange portion 55 for mounting the swing reducer 50 to the superstructure 101 of the excavator 100. Furthermore, the housing 52 comprises a supporting portion 56 for supporting the planetary gear module 1, which will be explained in the following. In the present embodiment, the supporting portion 56 is formed ring-like and is situated coaxially to the longitudinal direction L of the swing reducer 50.

The output shaft 51, which is supported inside the housing 52, has a first end portion 57, which is located, in longitudinal direction L of the swing reducer 50, at that end of the housing 52, where the supporting portion 56 is formed. In the present embodiment, the first end portion 57 of the output shaft 51 does not protrude beyond the supporting portion 56 in longitudinal direction L of the swing reducer 50. Furthermore, in the present embodiment, a spline toothing 58 is formed on the outer circumference of the first end portion 57 of the output shaft 51. The output shaft 51 has a second end portion 59, which is formed at the end opposite to the first end portion 57. The second end portion 59 protrudes beyond the housing 52 in the longitudinal direction L of the swing reducer 50. The second end portion 59 has a spline toothing 60 formed at the outer circumference thereof, which is suitable for engaging with the slewing ring 49 so as to transfer a torque for driving the swing reducer assembly 103 to the slewing ring 49.

Figure 4:
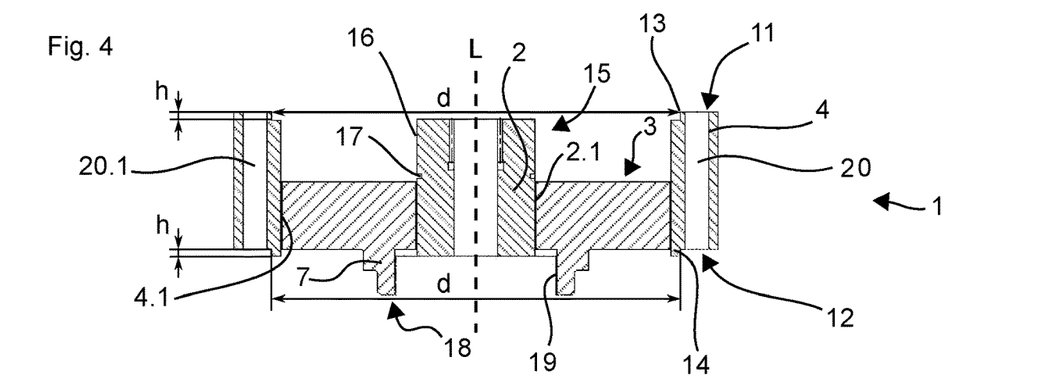
FIG. 4 schematically shows the planetary gear module of the swing reducer of FIG. 3.

Furthermore, the swing reducer 50 comprises a planetary gear module 1, which is schematically illustrated in FIG. 4. The planetary gear module 1 is formed in a modular fashion and is configured to be integrated in-between first and second adjacent planetary gear modules, which have an identical interface configuration, said interface configuration being described in the following, so as to transfer a torque through the entire planetary gear module chain.

The planetary gear module 1 comprises a planetary gear stage formed by a sun gear 2, a planetary carrier 3, and a ring gear 4. The ring gear 4 has an internal toothing portion 4.1, which extends approximately along half of the entire extension of the ring gear 4 in longitudinal direction L thereof. The sun gear 2 comprises a meshing portion 2.1, which extends approximately along half of the entire extension of the sun gear 2 in longitudinal direction L thereof. Furthermore, in the present embodiment, the planetary carrier 3 comprises four planet gears, two of which 5, 5.1 are shown in the detailed cross-sectional drawing of FIG. 5. The planet gears 5, 5.1 of the planetary carrier 3 mesh with the meshing portion 2.1 of the sun gear 2 and an internal toothing portion 4.1 of the ring gear 4. To avoid any movement of the ring gear 4, the planet gears 5, 5.1 and the sun gear 2 with respect to each other along the longitudinal direction L of the swing reducer 50, a helical toothing may be provided between the individual gears.

Figure 5:
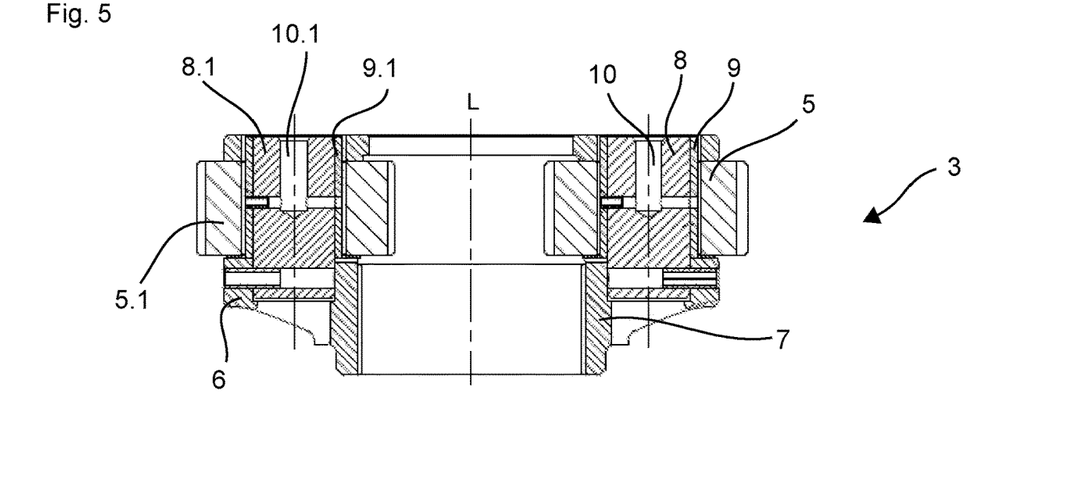
FIG. 5 detaily shows the carrier of the planetary gear module of FIG. 4.

As illustrated in FIG. 5, the planetary carrier 3 comprises a base carrier element 6 with a bushing portion 7, extending away from the base carrier element 6 in a first direction. In addition, the planetary carrier 3 comprises planetary shafts 8, 8.1, which extend away from the base carrier element 6 in a second direction, the first and second directions being opposing directions. The planetary shafts 8, 8.1 are each formed as support pins for respectively carrying a planet gear 5, 5.1. The planetary shafts 8, 8.1 exhibit a torque proof connection to the base carrier element 6 and therefore also to the bushing portion 7. In the present embodiment, a plain bearing is provided between the planetary shafts 8, 8.1 and the planet gears 5, 5.1. For that purpose, a slide bushing 9, 9.1 is press-fitted onto each of the planetary shafts 8, 8.1. To lubricate the plain bearings between the planetary shafts 8, 8.1 and the planet gears 5, 5.1, a lubrication hole 10, 10.1 is provided in each of the axes 8, 8.1, said lubrication hole 10, 10.1 allowing delivery of a lubricant, e.g. oil, into the gearing gap.

As derivable from FIG. 4, in the present embodiment, the ring gear 4 completely houses the sun gear 2 in the longitudinal direction L of the planetary gear module 1. Furthermore, the planetary gear module 1 is configured such that the planetary carrier 3 is completely housed inside the ring gear 4 in longitudinal direction L except for the bushing 7. Specifically, only the bushing 7 protrudes from the ring gear 4 in the longitudinal direction L.

Furthermore, the planetary gear module 1 comprises a stage support for supporting the gear stage, i.e. the sun gear 2, the planetary carrier 3 and the ring gear 4. In the present embodiment, the stage support is formed by the ring gear 4. The stage support, i.e. the ring gear 4, comprises an input support interface 11 and an output support interface 12. The input support interface 11 is matched to the output support interface 12 such that an output support interface of a structurally identical planetary gear module can be engaged with the input support interface of the present planetary gear module 1, and such that the output support interface 12 of the present module can be engaged with the input support interface of a structurally identical planetary gear module.

As derivable from FIG. 3, in the present embodiment, the input support interface 11 comprises a flat revolving support surface and a depression, which is formed as groove 13. The groove 13 is formed along the entire circumference of the ring gear 4. Furthermore, the groove 13 is situated at the inner surface of the ring gear 4 in radial direction thereof. In radial direction of the planetary gear module 1, the groove 13 extends from an inner diameter (not indicated) to an outer diameter d.

Furthermore, the output support interface 12 of the ring gear 4 comprises a protruding portion, which is formed as a rib 14 in the present embodiment. The rib 14 extends along the entire circumference of the ring gear 4 and is provided at the inner side of the ring gear 4 in radial direction thereof. As derivable from FIG. 4, the rib 14 has an extension in the longitudinal direction L, i.e. a height h. Furthermore, in radial direction, the rib 14 extends from an inner diameter (not indicated) to an outer diameter d. The rib 14 is configured such that it may be fitted into the groove 13. In other words, the height h of the rib 14 matches the height h of the groove 13. Furthermore, the outer diameter d of the rib 14 matches the outer diameter d of the groove 13. In conclusion, the output interface 12 allows for centering and positioning of the present planetary gear module 1 on an adjacent module with an input support interface of identical structure to the input support interface 11 of the present planetary gear module 1.

The planetary gear module 1 further comprises an input gear interface 15 for inputting a torque/power into the planetary gear module 1. Further details of the inter-module connection will be described below with reference to FIGS. 6 and 7. In the present embodiment, the input gear interface 15 is formed by the sun gear 2. The input gear interface 15 comprises a spline 16, which is formed at that end of the sun gear 2 in longitudinal direction L, which situated at the side of the input support interface 11. In contrast, the meshing portion 2.1 of the sun gear 2 is formed at that side of the sun gear 2, which situated at the side of the output support interface 12. The input gear interface 15 further comprises a groove 17. The groove 17 is provided between the meshing portion 2.1 and the spline 16 in longitudinal direction L of the planetary gear module 1. The groove 17 is configured to accommodate a snap ring, which will be described in the following.

Furthermore, the planetary gear module 1 comprises an output gear interface 18. The output gear interface 18 is configured to transmit a torque/power from the present planetary gear module 1 to an adjacent planetary gear module, as will be described in the following. In the present embodiment, the output gear interface 18 is formed by the planetary carrier 3. Specifically, the output gear interface 18 is formed by the bushing 7 of the planetary carrier 3, which was described in connection with FIG. 5 above. The output gear interface 18 comprises a spline 19, which is formed on the inside of the bushing 7. As described above, the bushing 7, and therefore also the output gear interface 18, extends beyond the ring gear 4 in longitudinal direction L of the planetary gear module 1. In conclusion, the output gear interface 18 of the planetary gear module 1 allows for an easy coupling of the planetary gear module 1 to an adjacent module with an input gear interface of identical structure to the input gear interface 15 of the planetary gear module 1. The output gear interface 18 of the present planetary gear module 1 is therefore matched to the input gear interface 15 of the present planetary gear module 1.

In conclusion, as the input support interface 11 and the output support interface 12 as well as the input gear interface 15 and the output gear interface 18 are matched to each other, stacking and operative coupling of planetary gear modules 1 according to the present disclosure becomes easily possible. Therefore, a modular, adaptable and retrofittable swing reducer is provided.

In the present embodiment, the above-described internal toothing portion 4.1 of the ring gear 4 is formed at that side of the ring gear 4 in longitudinal direction L, which is provided at the side of the output support interface 12. The ring gear 4 further comprises multiple through holes, two of which 20, 20.1 are shown in FIG. 4. The through holes 20, 20.1 extend from the input support interface 11 to the output support interface 12 in parallel to the longitudinal direction L through the entire planetary gear module 1.

The supporting portion 56 of the housing 52 is formed to accommodate the output support interface 12 of the planetary gear module 1. Specifically, the supporting portion 56 comprises an outer diameter corresponding to the outer diameter of the ring gear 4. Furthermore, the supporting portion 56 comprises a groove for engaging with the rib 14 of the output support portion 12 so as to fix the planetary gear module 1 in radial direction of the swing reducer 50. The supporting portion 56 comprises threaded bling holes, two of which 61, 61.1, are shown in FIG. 3. The positions of the blind holes 61, 61.1 correspond to the positions of the through hole 20, 20.1 of the ring gear 4. To fix the planetary gear module 1 on the supporting portion 56, bolts are inserted into the through hole 20, 20.1 and screwed into the threaded blind holes 61, 61.1 so as to tighten the planetary gear module 1 onto the housing 52.

In addition, the first end portion 57, i.e. the toothing 58, of the output shaft 51 is formed to be connected to the output gear interface 18 of the planetary gear module 1 via a transition sleeve 65. The transition sleeve 65 comprises an external spline for engaging with the internal spline 19 of the output gear interface 18 and an internal spline for engaging with the spline toothing 58 of the first end portion 57 of the output shaft 51. Furthermore, the transition sleeve 65 may comprise a limiting portion 66, e.g. a limiting ring, for limiting a movement of the planetary carrier 3 in the longitudinal direction L of the planetary gear module 1. Accordingly, a torque/power of the motor 48 input via the input gear interface 15 of the planetary gear module 1 into the swing reducer 50, may be transmitted by the planetary gear module 1 and output via the spline toothing 60 of the second end portion 59 of the output shaft 51 to the slewing ring 49 for effectuating a relative rotation of superstructure 101 and undercarriage 102 with respect to each other.

Figure 6:
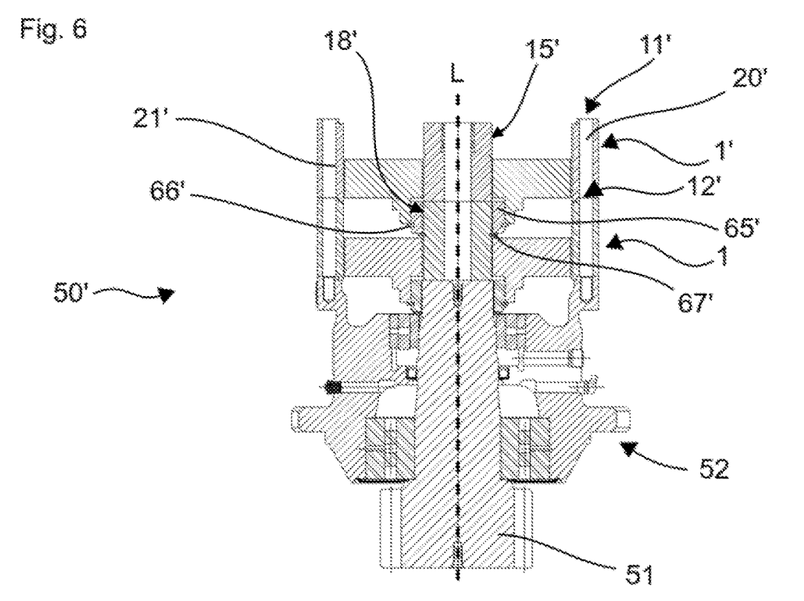
FIG. 6 schematically shows a cross-sectional view of a swing reducer according to a second embodiment of the present disclosure, the swing reducer comprising two planetary gear modules.
Figure 7:
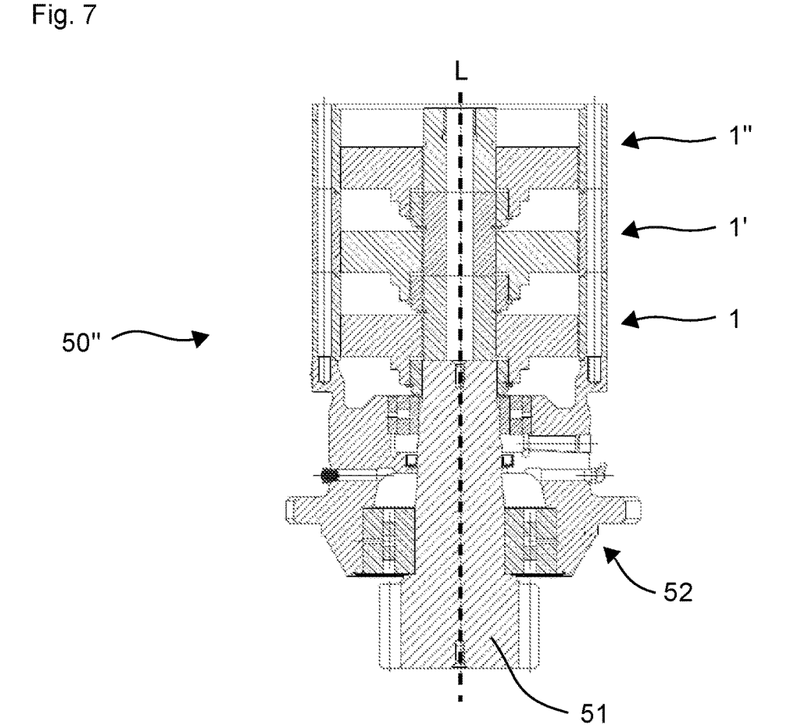
FIG. 7 schematically shows a cross-sectional view of a swing reducer according to third embodiment of the present disclosure, the swing reducer comprising three planetary gear modules.

FIGS. 6 and 7 show a swing reducer 50', 50" according to a second and third embodiment of the present disclosure. The swing reducers 50', 50" of the second and third embodiments are configured as the swing reducer 50 of the first embodiment except for the differences described below. Alike elements are denoted by the same reference signs. The swing reducer 50' of the second embodiment distinguishes over the swing reducer 50 of the first embodiment by having two planetary gear modules 1, 1' connected in series to each other. Such a reducer may also be called a two-stage reducer. The swing reducer 50" shown in FIG. 7 comprises three planetary gear modules 1, 1', 1" connected in series and may also be called a three-stage reducer.

The planetary gear modules of the second and third embodiments are configured identical to the planetary gear module 1 of the first embodiment. Specifically, the output support interface 12', the input support interface 11', the output gear interface 18' and the input gear interface 15' of the second planetary gear module 1' of the second embodiment are configured identical to the respective interfaces of the first planetary gear module 1. The same applies to the interfaces of the second and third planetary gear modules 1', 1" of the third embodiment. However, the transmission ratios of first, second and third planetary gear modules 1, 1', 1" may be different from each other. In other words, the sun gear, the planet gears and the ring gears of the different planetary gear modules 1, 1', 1" may have different tooth numberings.

The second planetary gear module 1' of the second embodiment is stacked onto the first planetary gear module 1 by bringing the output support interface 12' of the second planetary gear module 1' into engagement with the input support interface 11 of the first planetary gear module 1. Likewise, the output gear interface 18' of the second planetary gear module 1' is brought into engagement with the input gear interface 15 of the first planetary gear module 1 via a transition sleeve 65'. The transition sleeve 65' is formed identical to the transition sleeve 65 of the first embodiment, also comprising a limiting portion 66' for limiting a movement of the planetary carrier of the second planetary gear module 1' in longitudinal direction L. The transition sleeve 65' is positioned, i.e. fixed in the longitudinal direction L, through a snap ring 67' installed in the groove 17 on the sun gear 2 of the first planetary gear module 1.

As both ring gears 1, 1' have an identical interface configuration, it is possible to simple stack them together forming a two-stage reducer without the need for an additional housing. A bolt may be inserted into the through holes 20, 20', 21, 21' of both ring gears to extend through both holes and being screwed into the threaded blind holes 61, 61.1 of the housing 52. Thus, both ring gears of the planetary gear modules 1 and 1' are fixed relatively to each other and are tightens to the housing 52 via the bolts.

Turning to the third embodiment shown in FIG. 7, the second planetary gear module 1' is attached to the first planetary gear module 1, and the third planetary gear module 1" is attached to the second planetary gear module 1' in the above-described identical fashion.

The single planetary gear modules 1, 1', 1" may have identical or different gear ratios, as described above. A kit of parts comprising a plurality of planetary gear modules with different gear ratios may be provided. The planetary gear modules may each be used alone or in an arbitrary combination with the other two planetary gear modules to allow for a plurality of gear ratios with basically the same swing reducer. To adapt the gear ratio of the swing reducer, a further planetary gear module has to be added and/or removed from the swing reducer in the manner as described above. This adaption of the swing reducer may be done during manufacturing of the same. However, it is also conceivable that the swing reducer is retrofitted, e.g. during a maintenance operation and/or while replacing the drive system of the swing drive, e.g. from a hydraulic to an electric drive.

For example, with a kit of parts comprising three times a first stage module 1 with a first transmission ratio, three times a second stage module 1' with a second transmission ratio different from the first, and three times a third stage module 1" with a third transmission ratio different from the first and second, nineteen different gear ratios of the swing reducer can be achieved as shown in the following table.

| 1-stage swing reducer (shown FIG. 3) | only module 1, only module 1', only module 1", | 3 different gear ratios |
|---|---|---|
| 2-stage swing reducer (shown FIG. 6) | combination of modules 1 and 1, combination of modules 1' and 1', combination of modules 1" and 1", combination of modules 1 and 1', combination of modules 1 and 1", combination of modules 1' and 1", | +6 different gear ratios |
| 3-stage swing reducer (shown FIG. 7) | combination of modules 1, 1 and 1, combination of modules 1, 1 and 1', combination of modules 1, 1 and 1", combination of modules 1,1' and 1', combination of modules 1,1" and 1", combination of modules 1,1' and 1", combination of modules 1', 1' and 1', combination of modules 1', 1' and 1", combination of modules 1', 1" and 1", combination of modules 1", 1" and 1", | +10 different gear ratios |
| | | =19 different gear ratios |

What is claimed is:

1. A planetary gear module for a swing drive of a construction machine, the planetary gear module being configured to be integrated in-between first and second adjacent planetary gear modules, the planetary gear module comprising:

a planetary gear stage; and a stage support for supporting the planetary gear stage;

the stage support comprising an input support interface for stacking the first adjacent planetary gear module onto the planetary gear module and an output support interface for stacking the planetary gear module onto the second adjacent planetary gear module;

the planetary gear stage comprising an input gear interface for operatively connecting the planetary gear module to a gear of the first adjacent planetary gear module and an output gear interface for operatively connecting the planetary gear module to a gear of the second adjacent planetary gear module; and the output support interface and the input support interface as well as the output gear interface and the input gear interface of the planetary gear module are configured to match to each other, wherein the planetary gear stage comprises a sun gear, a planetary carrier, and a ring gear, wherein the ring gear completely houses the sun gear, and wherein the ring gear forms the stage support, and wherein the sun gear comprises a groove for accommodating a snap ring, within which a transition sleeve for connecting the input gear interface to the gear of the first adjacent planetary gear module is positioned.

2. The planetary gear module according to claim 1, wherein the ring gear comprises a through hole for insertion of a bolt to fix the planetary gear module to the first and second adjacent planetary gear modules.

3. The planetary gear module according to claim 1, wherein the input gear interface comprises a spline, and wherein the input gear interface is formed by the sun gear.

4. The planetary gear module according to claim 1, wherein the output gear interface is formed by the planetary carrier, wherein the planetary carrier comprises a bushing, and wherein the bushing comprises an inner spline or extends beyond the ring gear.

5. The planetary gear module according to claim 1, wherein the input support interface and the output support interface are formed by complementary portions, and wherein the complementary portions include a protruding portion and a complementary depression.

6. The planetary gear module according to claim 1, wherein the swing drive is a swing reducer.

7. A kit of parts, comprising the planetary gear module according to claim 1 as a first planetary gear module and a second planetary gear module, wherein the first planetary gear module comprises:

a first planetary gear stage; and a first stage support for supporting the first planetary gear stage;

the first stage support comprising a first input support interface and a first output support interface;

the first planetary gear stage comprising a first input gear interface and a first output gear interface; and the first output support interface and the first input support interface as well as the first output gear interface and the first input gear interface of the first planetary gear module are configured to match to each other;

wherein the second planetary gear module comprises:
a second planetary gear stage; and
a second stage support for supporting the second planetary gear stage;
the second stage support comprising a second input support interface and a second output support interface;
the second planetary gear stage comprising a second input gear interface and a second output gear interface; and
the second output support interface and the second input support interface as well as the second output gear interface and the second input gear interface of the second planetary gear module are configured to match to each other; and
wherein the first planetary gear module and the second planetary gear module have different gear ratios.

8. The kit according to claim 7, wherein:
the first output support interface of the first planetary gear module is engaged with the second input support interface of the second planetary gear module; and
the first output gear interface of the first planetary gear module is operatively connected to the second input gear interface of the second planetary gear module.

9. The kit according to claim 8, further comprising:
a transition sleeve, wherein the transition sleeve is arranged to operatively connect the first output gear interface of the first planetary gear module to the second input gear interface of the second planetary gear module.

10. The planetary gear module according to claim 1, wherein the planetary carrier comprises four planet gears.

11. A swing reducer for a construction machine comprising:
a housing; and
a planetary gear module comprising:
a planetary gear stage; and
a stage support for supporting the planetary gear stage;
wherein the stage support comprises an input support interface for stacking a first adjacent planetary gear module onto the planetary gear module and an output support interface for stacking the planetary gear module onto a second adjacent planetary gear module; and
wherein the planetary gear stage comprises:
an input gear interface for operatively connecting the planetary gear module to a gear of the first adjacent planetary gear module;
an output gear interface for operatively connecting the planetary gear module to a gear of the second adjacent planetary gear module;
a sun gear, wherein the sun gear comprises a groove for accommodating a snap ring, with which a transition sleeve for connecting the input gear interface to the gear of the first adjacent planetary gear module is positioned;
a planetary carrier; and
a ring gear that completely houses the sun gear and forms the stage support,
wherein the output support interface and the input support interface as well as the output gear interface and the input gear interface are configured to match to each other; and
wherein the planetary gear module is attached to the housing via a bolt, the bolt extending through a through hole formed in a ring gear of the planetary gear module.

12. The swing reducer according to claim 11, wherein the input gear interface comprises a spline and wherein the input gear interface is formed by the sun gear.

13. The swing reducer according to claim 11, wherein the output gear interface is formed by the planetary carrier, wherein the planetary carrier comprises a bushing, and wherein the bushing comprises an inner spline or extends beyond the ring gear.

14. The swing reducer according to claim 13, wherein the input support interface and the output support interface are formed by complementary portions, and wherein the complementary portions include a protruding portion and a complementary depression.

15. The swing reducer according to claim 11, wherein the planetary carrier comprises four planet gears.

16. The swing reducer according to claim 15, wherein the planet gears mesh with the sun gear and the ring gear, and wherein the sun gear and the ring gear do not mesh with each other.

17. A planetary gear module for a swing drive of a construction machine, the planetary gear module being configured to be integrated in-between first and second adjacent planetary gear modules, the planetary gear module comprising:
a planetary gear stage; and
a stage support for supporting the planetary gear stage;
the stage support comprising an input support interface for stacking the first adjacent planetary gear module onto the planetary gear module and an output support interface for stacking the planetary gear module onto the second adjacent planetary gear module;
the planetary gear stage comprising an input gear interface for operatively connecting the planetary gear module to a gear of the first adjacent planetary gear module and an output gear interface for operatively connecting the planetary gear module to a gear of the second adjacent planetary gear module, wherein the planetary gear stage comprises a sun gear, a planetary carrier, and a ring gear, and wherein the sun gear comprises a groove for accommodating a snap ring, within which a transition sleeve for connecting the input gear interface to the gear of the first adjacent planetary gear module is positioned; and
the output support interface and the input support interface as well as the output gear interface and the input gear interface of the planetary gear module are configured to match to each other.

18. The planetary gear module according to claim 10, wherein the planet gears mesh with the sun gear and the ring gear, and wherein the sun gear and the ring gear do not mesh with each other.

* * * * *